W. WEILER.
DYNAMO ELECTRIC MACHINE.
APPLICATION FILED FEB. 11, 1913.

1,104,233.

Patented July 21, 1914.

Witnesses:

Inventor:
Wilhelm Weiler,
by
His Attorney.

UNITED STATES PATENT OFFICE.

WILHELM WEILER, OF BERLIN, GERMANY, ASSIGNOR TO GENERAL ELECTRIC COMPANY, A CORPORATION OF NEW YORK.

DYNAMO-ELECTRIC MACHINE.

1,104,233.　　　　Specification of Letters Patent.　　Patented July 21, 1914.

Application filed February 11, 1913.　Serial No. 747,690.

*To all whom it may concern:*

Be it known that I, WILHELM WEILER, a subject of the King of Prussia, residing at Berlin, Germany, have invented certain new and useful Improvements in Dynamo-Electric Machines, of which the following is a specification.

My invention relates to dynamo electric machines, and particularly to generators having separately excited field windings, and has for its object a novel arrangement for shortening the length of time required for the building up of the excitation of such generators.

The various features of novelty which characterize my invention are pointed out with particularity in the claims annexed to and forming a part of this specification.

For a better understanding of my invention, reference may be had to the following description taken in connection with the accompanying drawing, in which—

Figure 1:
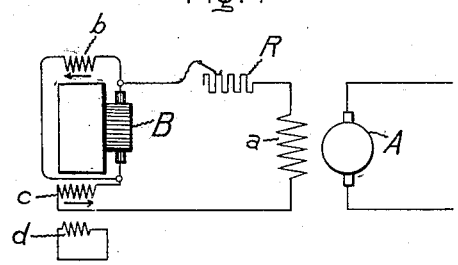
Figure 2:
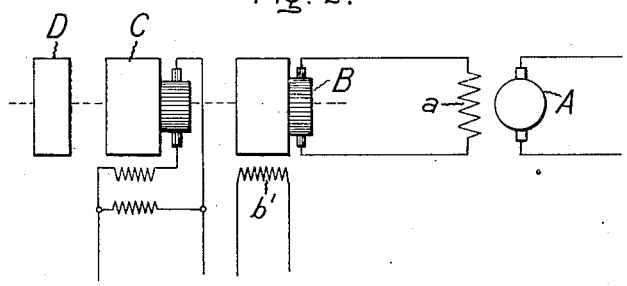

Figure 1 shows diagrammatically a separately excited generator arranged in accordance with my invention, and Fig. 2 shows a modified arrangement.

In the drawing, A represents the armature and $a$ the field winding of a separately excited generator. The field winding $a$ is excited by an exciter B, the voltage of which decreases as the current supplied by it increases, whereby the voltage applied to the winding $a$ at the instant when it is first excited is higher than later when the exciter is supplying this field winding with considerable current. By exciting the winding $a$ from such an exciter, the length of time required for the building up of the excitation of generator A is shortened, the effect being similar to decreasing the time constant of the circuit of this winding. Ordinarily, however, the decrease in voltage of an exciter, as described above, follows the increase in current with a very small time lag.

According to my invention, the decrease in voltage of such an exciter is made to follow the increase in current with a considerable time lag by suitable means which will be explained hereinafter. By employing such means, the time during which the high voltage is applied to the field winding $a$ is considerably increased, and the length of time required for the building up of the excitation of generator A is still further shortened.

In the arrangement of Fig. 1, the exciter B has a shunt winding $b$ and a series winding $c$, which is wound differentially with respect to the winding $b$. A variable resistance R is placed in circuit with the field winding $a$ of the generator so as to vary the strength of the generator field, and consequently the voltage produced by the generator. In order to increase the magnetic time lag of the exciter, I provide its field poles with a short circuited or damping winding $d$. Such a damping winding acts to retard the variation in the field flux of the exciter. Consequently the decrease in the potential of the exciter, due to its being differentially compounded, does not follow the increase in its load current, but lags considerably behind it, and the length of time required for the building up of the excitation of generator A is considerably shortened, as explained above.

In the arrangement shown in Fig. 2, the same result is attained by driving the exciter by a motor, the speed of which decreases with increasing load, such as a compound wound motor C, coupled to a fly-wheel D. In this case, the potential of the exciter decreases with the increase of current supplied by the exciter because it is driven by a motor, the speed of which decreases with increasing load, and the fly-wheel causes the decrease in speed of the exciter to lag behind the increase in the load thereon, and thus the time during which a high voltage is applied to the field winding $a$ is increased and the length of time required for the building up of the excitation of generator A is shortened. In this figure of the drawing, I have shown the exciter with a separately excited field winding $b'$, the strength of which is varied in order to vary the excitation of the generator A.

It is obvious that the fly-wheel D of Fig. 2 may be replaced by a damping winding on the exciter B, as shown in Fig. 1, and I aim in the appended claims to cover such a modification as well as any other modifications which do not depart from the spirit and scope of my invention.

What I claim as new and desire to secure by Letters Patent of the United States, is:—

1. In combination, a generator provided with a separately excited field winding, an exciter supplying said field winding, means for causing the voltage of said exciter to decrease as the current thereby increases, and means for delaying the voltage reducing effect of said first mentioned means.

2. In combination, a generator provided with a separately excited field winding, an exciter supplying said field winding, means for causing the voltage of said exciter to decrease with increasing current, and further means for increasing the magnetic time lag of said exciter.

3. In combination, a generator provided with a separately excited field winding, an exciter supplying said field winding, said exciter having a field winding and a series field winding wound differentially with respect thereto, and further means for increasing the magnetic time lag of said exciter.

4. In combination, a generator provided with a separately excited field winding, and an exciter supplying said field winding, said exciter having a field winding, a series field winding wound differentially with respect thereto, and a short circuited field winding.

5. In combination, a generator provided with a separately excited field winding, an exciter supplying said field winding, said exciter having a field winding and a series field winding wound differentially with respect thereto, and means for delaying the voltage reducing effect of said differential series field winding.

In witness whereof, I have hereunto set my hand this 25th day of January, 1913.

WILHELM WEILER.

Witnesses:
RICHARD VENMANN,
CROSTIANDRUS SARLI.

Copies of this patent may be obtained for five cents each, by addressing the "Commissioner of Patents, Washington, D. C."